United States Patent [19]

Terpstra

[11] Patent Number: 5,086,910
[45] Date of Patent: Feb. 11, 1992

[54] ZONE CONTROLLED CONVEYANCE SYSTEM

[75] Inventor: Paul D. Terpstra, Janesville, Wis.

[73] Assignee: Giddings & Lewis, Inc., Fond du Lac, Wis.

[21] Appl. No.: 565,726

[22] Filed: Aug. 13, 1990

[51] Int. Cl.⁵ .............................................. B65G 43/08
[52] U.S. Cl. ........................................ 198/572; 198/781; 198/782; 198/790
[58] Field of Search ................ 198/781, 782, 787, 788, 198/790, 791, 572, 349

[56] References Cited

U.S. PATENT DOCUMENTS

| | | | |
|---|---|---|---|
| 3,193,081 | 7/1965 | Harrison et al. | 198/572 |
| 3,530,571 | 9/1970 | Perry | 198/349 X |
| 3,716,129 | 2/1973 | Sadler, Jr. | 198/781 |
| 3,770,103 | 11/1973 | Ball et al. | 198/788 |
| 3,810,538 | 5/1974 | Moyes | 198/781 |
| 3,960,262 | 6/1976 | Henig | 198/781 X |
| 3,980,170 | 9/1976 | Jakes et al. | 198/788 |
| 4,096,942 | 6/1978 | Sheperd | 198/781 |
| 4,108,303 | 8/1978 | Vogt et al. | 198/781 |
| 4,109,783 | 8/1978 | Vogt | 198/781 |
| 4,174,777 | 11/1979 | Riehle | 198/781 |
| 4,227,607 | 10/1980 | Malavenda | 198/572 X |
| 4,240,538 | 12/1980 | Hawkes et al. | 198/572 X |
| 4,383,605 | 5/1983 | Harwick | 198/781 |
| 4,817,784 | 4/1989 | Judge | 198/781 |

FOREIGN PATENT DOCUMENTS

| | | | |
|---|---|---|---|
| 3215921 | 11/1983 | Fed. Rep. of Germany | 198/788 |
| 0274602 | 12/1989 | Fed. Rep. of Germany | 198/782 |

Primary Examiner—D. Glenn Dayoan
Attorney, Agent, or Firm—Donald Cayen

[57] ABSTRACT

A zone controlled conveyance system includes a series of modular sections arranged end-to-end to define a path along which a workpiece is propelled. Each section is divided into one or more zones. Each zone includes a number of rollers that support the workpiece and propel it in the downstream direction in accordance with the energization of a separate motor drivingly connected to each roller. Sensors associated with each zone sense the presence or absence of a workpiece within the zone. The sensors cooperate with a controller to selectively energize or deenergize the motors of the various zones in a manner that controls downstream propulsion or accumulation of the workpieces. The sections include radiussed sections and sharp corner sections. The sharp corner sections may include a turntable that changes the workpiece orientation.

19 Claims, 10 Drawing Sheets

ZONE CONTROLLED CONVEYANCE SYSTEM

BACKGROUND OF THE INVENTION

1. Field of the Invention

This invention pertains to material handling, and more particularly to apparatus for controlling the movement of discrete workpieces.

2. Description of the Prior Art

An inherent characteristic of the process of manufacturing many products is the transfer of partially completed products in the form of workpieces between different work stations. At each work station, the workpiece is subjected to one or more operations that ultimately result in a finished product. Accordingly, a vital part of product manufacturing is the movement of workpieces through manufacturing machinery.

The workpiece is typically transported along an elongated path having a length and configuration suitable for the necessary manufacturing operations. A common feature of workpiece transport systems is the intermittent manner in which they move the workpieces along the path through the manufacturing machinery. The workpiece transport system must not only move workpieces between the various work stations, it must also stop the workpieces at the work stations and maintain them in position there while the workpieces undergo the necessary manufacturing operations. Various stopping and locating mechanisms are often used to position and rigidly hold the workpiece in place at a work station. At the conclusion of the particular operation, the workpiece is released to be transported downstream to the next work station. Typical applications of workpiece transport systems include transfer lines used in conjunction with machine tools for machining workpieces. Other systems are employed to transport individual components between welding stations at which the components are joined together into a desired structure. A particularly important application of workpiece transport systems is the modern assembly machine.

Various types of transport systems have been developed to move workpieces along the paths of the different types of manufacturing machinery. In some transport systems, continuous chains are used to propel the workpiece along the required path. Typical chain-type equipment is produced by Gilman Assembly Automation of Janesville, Wis.; Robotrac, Inc. of Addison, Ill.; and by IT Equipment, Inc. of South Bend, Ind.

In other workpiece transporting equipment, the workpieces are supported on and propelled by rollers that define the workpiece path. Typical suppliers of roller equipment include High Technology Associates of Houston, Tex.; Sponmech, Limited of Stourbridge, England; Automated Manufacturing Systems, Inc. of Fenton, Mich.; Harry Major Machine & Tool Company of Fraser, Mich.; IT Equipment, Inc. of South Bend, Ind.; and Rockwell International of Farmington, Mich.

In all the foregoing systems, a main drive mechanism continuously urges the rollers or chains to propel the workpieces downstream. To stop a workpiece at a work station, suitable mechanical stops are employed. Upon striking a stop, the workpiece is halted. However, because the main drive mechanism continues to operate, sliding motion is created somewhere in the system between the stationary workpiece and the moving main drive mechanism. In chain type equipment, sliding occurs between the chains and the workpiece. In roller type equipment, the rollers are halted, as by means of one or more friction clutches, so that no sliding occurs between the workpiece and the rollers. When a particular workpiece is stopped, other workpieces upstream from it are also stopped, usually by other positive stops. Upon the release of a workpiece, the upstream workpieces are also released for downstream propulsion. A suitable controller monitors the locations of the workpieces and appropriately actuates the various mechanical stops to control workpiece flow through the system.

The prior workpiece transport systems generally work quite well, and they are in widespread use. Nevertheless, they do possess certain disadvantages. Monitoring the locations and movement of numerous workpieces and controlling the mechanical stops requires a large and sophisticated controller. The cost of the electrical wiring between the sensors and controller and of the fluid piping and related components associated with the stops is very high. In addition, manufacturing, assembling, and servicing the numerous mechanical stops is undesirably expensive.

Roller type transport systems require the workpiece paths to be divided into relatively short sections, with each section having its own drive motor. If a component in any drive fails, the entire transport system is put out of service until the failed drive component is repaired or replaced. In many applications, sliding between the chains or rollers and the workpiece is highly undesirable. The friction clutches associated with some prior transport systems have the disadvantage of requiring periodic adjustment. Even with care the clutches are prone to transmitting variable torque due to contamination and misadjustment.

The Buschman Company of Cincinnati, Ohio, manufactures a conveyor that utilizes air controlled clutches and rollers, and the conveyor is divided into zones. A single sensor in each zone controls when the rollers of the adjacent upstream zone are to rotate or to remain stationary, and thus whether a workpiece is to be propelled along the adjacent upstream zone. However, pneumatic control is not well accepted for assembly machine applications, and little bottom access is available on such installations. Further, the capacity for transporting workpieces and pallets is undersirably low.

Thus, a need exists for improvements in workpiece transport equipment.

SUMMARY OF THE INVENTION

In accordance with the present invention, a zone controlled conveyance system is provided that propels and controls workpieces along a path in a more economical and versatile manner than was previously possible. This is accomplished by apparatus that includes a large number of individually driven workpiece supporting and propelling rollers.

The workpiece path is defined by a sturdy elongated frame, to which the rollers are mounted. The frame may be of any length and configuration necessary to suit a particular workpiece and the operations to be performed on it. The workpiece is frequently mounted on a pallet, which, in turn, is supported on the rollers. Rotation of the rollers propels the pallet in a downstream direction along the frame path.

To rotate the rollers, each is connected to an individual electric motor by a suitable drive mechanism, such as a timing belt and pulley. Upon energization of an electric motor, the associated roller rotates, and a pallet on the roller is propelled by it in the downstream direction.

Further in accordance with the present invention, the frame is divided into a number of modular sections. As many sections as necessary are assembled end-to-end to make up the desired path length and configuration. Each section, in turn, is divided into a number of pallet control zones. In general, there is one pallet control zone for each pallet that fits completely onto a frame section.

The electric motors and rollers of each pallet control zone are controlled independently of the motors and rollers of all other zones except the adjacent downstream zone. Especially in automatic assembly machines, the independent zone control of the zone controlled conveyance system makes possible the use of a smaller and less expensive central controller and the reduction in wiring and plumbing compared with prior workpiece transport equipment.

Control of the rollers and thus of the pallets within each pallet control zone is achieved by a number of sensors, such as limit or proximity switches, installed in each section. A first sensor of each section is located at the upstream end of the section, which is also the location of the upstream end of the first or upstream zone of the section. A second sensor is located at the downstream end of the first zone, which is the upstream end of the adjacent downstream or second zone. There is a sensor at the downstream end of each additional zone in the section. In addition, there is an auxiliary sensor located at the upstream end of the first zone in each section in transverse alignment with the first sensor. All the sensors except the auxiliary sensor and all the motors of a section are wired to a conventional controller, such as a programmable logic controller, independent of all other sections. In that manner, each section is self-contained both mechanically and electrically, with the exception pertaining to the auxiliary sensor in the adjacent downstream zone to be explained presently.

In operation, it will be initially assumed that no pallet is present on a particular section. The leading edge of a pallet being propelled downstream from the adjacent upstream section enters the particular section and actuates the first sensor located thereon. The first sensor is wired to energize the motors of the first zone of the section. The rollers of the first zone thus rotate and propel the pallets downstream into the first zone. Pallet propulsion continues until its leading edge actuates the second sensor. At that point, the second sensor energizes the motors of the second zone, such that as the rollers of the first zone propel the pallet into the second zone, the second zone rollers rotate to receive and propel the pallet into the second zone. Eventually, the pallet trailing edge deactuates the second sensor. That action causes the motors of the first zone to become deenergized and stop rotation of the first zone rollers. In the same manner, the pallet leading edge sequentially actuates the sensors at the upstream ends of any additional pallet control zones on the section to energize the respective electric motors of those zones. Also, the pallet trailing edge deactuates the upstream sensors of the additional zones as the pallet enters completely into the zones. Consequently, the rollers of a zone stop rotating after the pallet and its associated workpiece have passed completely through the zone.

The sensor at the downstream end of a particular pallet control zone does not necessarily energize the motors of the adjacent downstream zone when that sensor is actuated by a pallet leading edge. Rather, before the downstream sensor of a particular zone, such as the first zone of a section, energizes the motors of the adjacent downstream or second zone, the status of the sensor at the downstream end of the second zone is checked. If the sensor at the downstream end of the second zone is actuated to the status produced by the sensing of the presence of a pallet, the sensor at the downstream end of the first zone does not energize the motors of the second zone. That is because a pallet is already in the second zone, as, for example, at a work station, pallet movement will not occur. Further, when the sensor at the downstream end of the first zone senses a pallet at the second zone, that sensor acts to deenergize the motors of the first zone. In that manner, the pallets are always separated, and pallet accumulation can occur without bumping.

Stopping the pallets at various work stations may be controlled by a master controller or by individual section controllers. However, no control of the pallets located in pallet control zones located between work stations is required by the master controller. That is because each section includes a conventional controller, such as a programmable logic controller or the like, to control the zones of that section. The various sensors of a section are wired to the programmable controller to monitor the presence or absence of a pallet in the adjacent downstream zone of a particular pallet control zone to thereby enable or inhibit propulsion of a pallet through one zone and into the adjacent downstream zone. Upon completion of the required operations on the pallet at a work station, the programmable logic controller starts the electric motors of the work station zone and of the adjacent upstream zone, if a pallet is present there, to propel the pallet into the work station zone without command from the master controller.

As mentioned, there is an auxiliary sensor located at the upstream end of the first zone of each section. The purpose of the auxiliary sensor is to cooperate with the sensor at the downstream end of the last zone of the adjacent upstream section to determine whether a pallet is stopped at the first zone of the particular section. The auxiliary sensor is wired to the programmable logic controller of the adjacent upstream section. The wiring of the auxiliary sensor of a particular section to the programmable controller of the adjacent upstream section constitutes the single exception to the general characteristic of the present invention that each section is controllable independently of all other sections.

Additional advantages, benefits, and features of the invention will become apparent to those skilled in the art upon reading the detailed description of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

GENERAL

Figure 1:
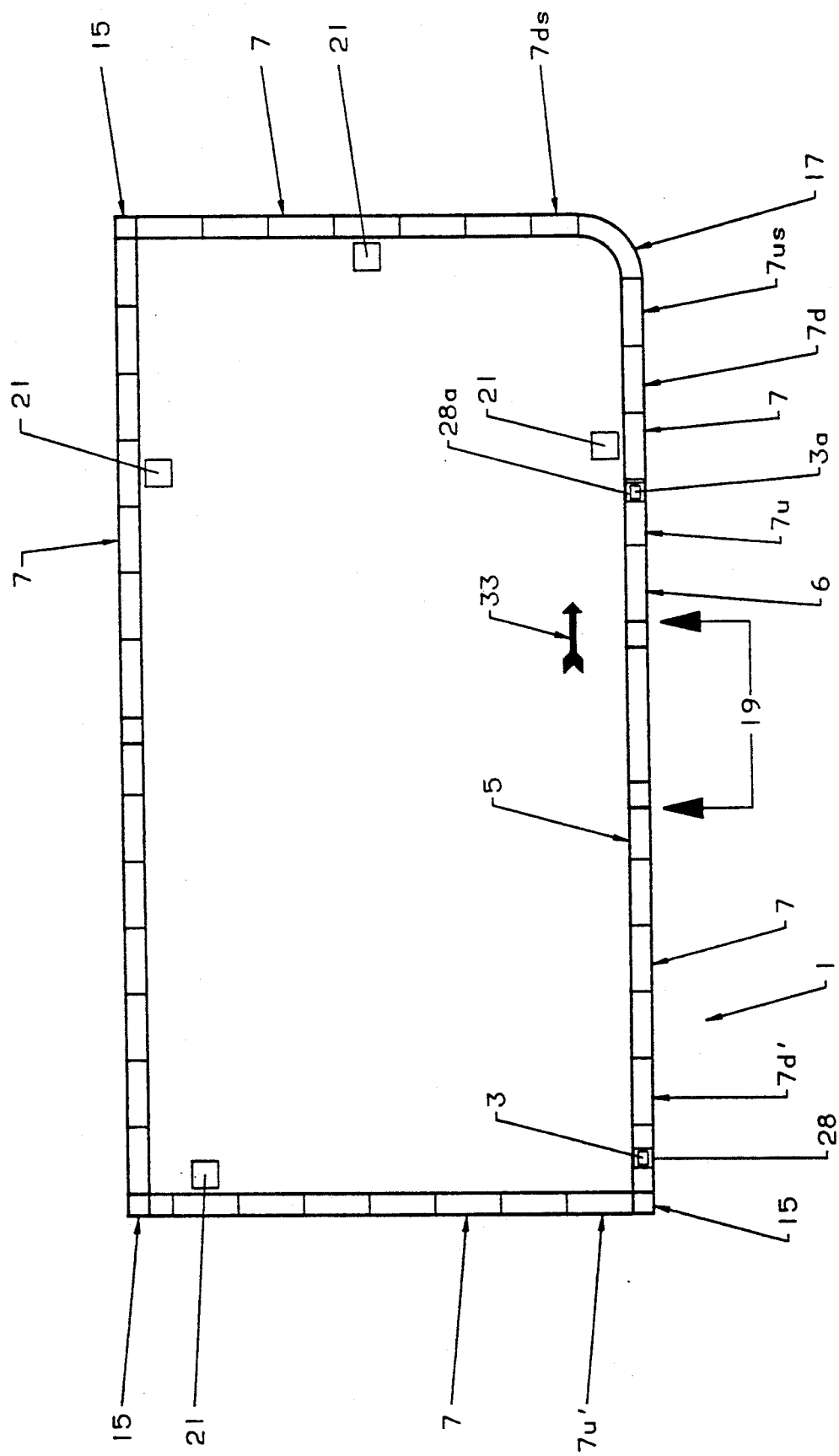
FIG. 1 is a simplified top view of a typical path defined by a zone controlled conveyance system according to the present invention along which a workpiece travels during a manufacturing process.

Referring to FIG. 1, reference numeral 1 indicates a generally horizontal path along which a workpiece 3 is propelled by the zone controlled conveyance system 5 of the present invention. The zone controlled conveyance system 5 is particularly useful in conjunction with an automatic assembly machine 6, in which the workpiece 3 is propelled between different work stations typically represented at reference numerals 21. At each work station 21, one or more selected components are assembled to the workpiece 3 until a finished assembly is created for removing from the automatic assembly machine 6. However, it will be understood that the invention is also applicable to numerous other types of manufacturing equipment and processes. In addition, the particular path 1 illustrated is merely representative of a wide variety of path sizes and configurations that may be necessary to suit the specific manufacturing operations required for a particular workpiece 3.

The path 1 is partially defined by a number of modular straight sections 7 that are placed end-to-end to form a portion of the automatic assembly machine 6. The path 1 is further defined by corner sections. The corner sections may form sharp angles, as at right angle corners 15, or the corner sections may be radiussed as at reference numeral 17. The automatic assembly machine can include any number and combination of straight sections 7 and corner sections 15 and 17 to meet the needs of a particular assembly application. In addition, the automatic assembly machine may include a workpiece loading and unloading area, schematically represented at reference numeral 19, as is known in the art. Vertical transporting machinery, not illustrated in the drawings, may also be incorporated into the workpiece path 1 of the automatic assembly machine.

STRAIGHT SECTIONS

Figure 2:
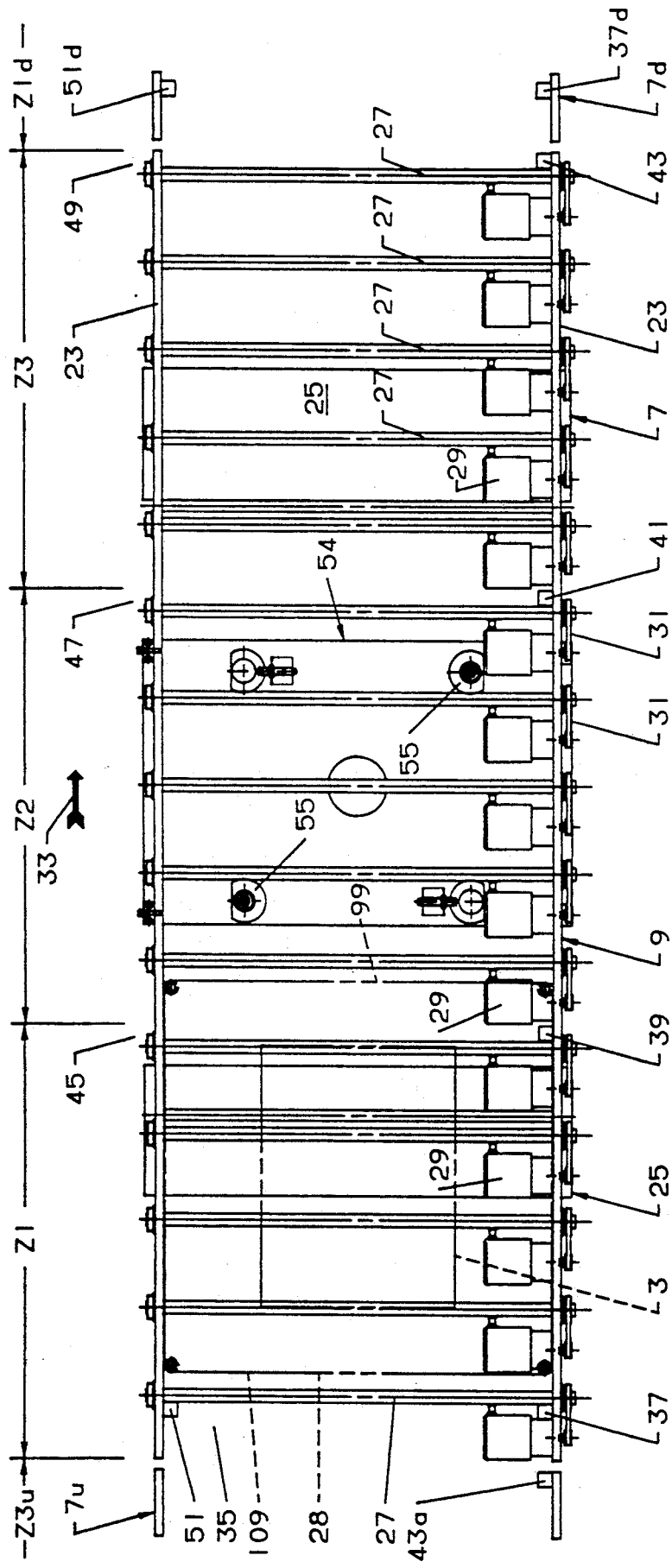
FIG. 2 is a top view of a typical section of the zone controlled conveyance system of the present invention.
Figure 3:
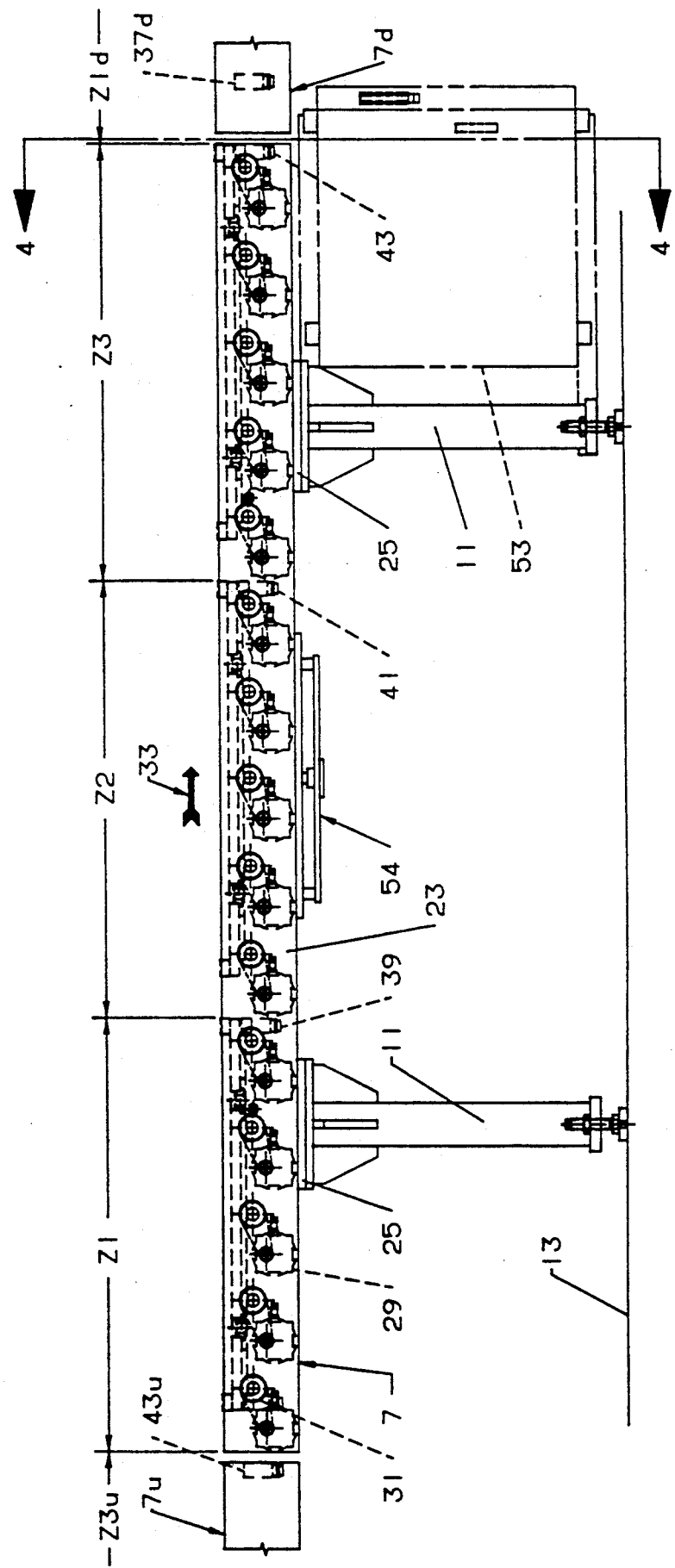
FIG. 3 is a front view of FIG. 2.
Figure 4:
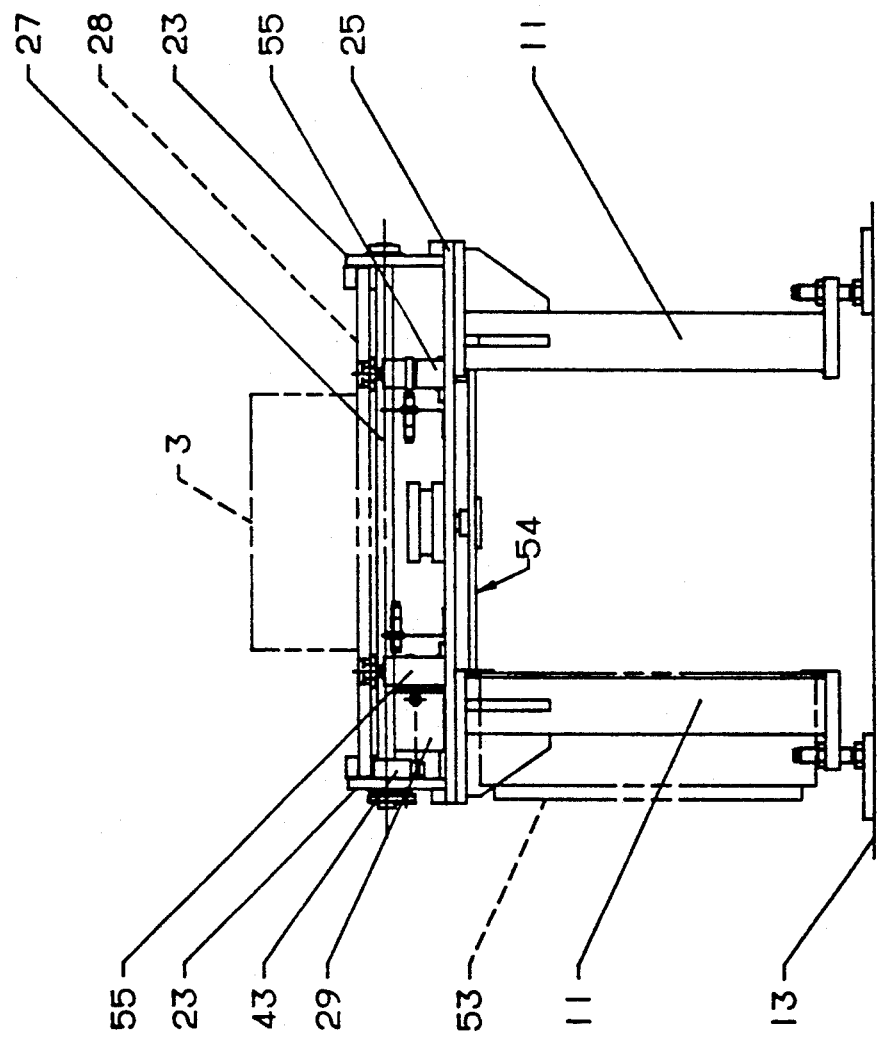
FIG. 4 is a view taken along lines 4—4 of FIG. 3.

Also looking at FIGS. 2-4, each straight section 7 of the automatic assembly machine 6 is comprised of a frame 9 that includes pairs of legs 11 placed on the factory floor 13. A support plate 25 stands and ties together the legs 11 of each pair. The frame 9 further has upstanding parallel side rails 23 connected to the support plates 25. Mounted between the side rails 23 in appropriate bearings are a series of rollers 27. The tops of the rollers 27 define a horizontal plane that supports the workpieces 3. In many cases, the workpieces are fixed to respective pallets 28, in which case the pallets contact and are supported by the rollers 27, as is known in the art.

To rotate the rollers 27, the zone controlled conveyance system 1 includes a separate electric motor 29 for each roller. The electric motors 29 may be stepper motors as are known in the industry. The motors may also be torque motors such as Model Number 628 or induction motors such as Model Number 451 as manufactured by Bodine Electric Company of Chicago, Ill. The motors are fastened to one of the frame side rails 23 by suitable fasteners. A drive mechanism 31, such as a timing belt and pulley arrangement, connect the rollers 27 to the associated motors 29. Consequently, energization of a particular motor causes the associated roller to rotate. In turn, rotation of the rollers causes a workpiece 3, together with any pallet 28 on which it may be mounted, to be propelled in a downstream direction 33. For each particular section 7, there is a corresponding upstream section 7u and a downstream section 7d.

SECTION ZONES

Further in accordance with the present invention, the rollers 27 and corresponding electric motors 29 of each straight section 7 are grouped into an integral number of independently controlled zones. The number of zones is equal to the number of workpieces 3 or pallets 28 that can fit completely on the section frame 9. FIGS. 2 and 3 show a three zone section having zones Z1, Z2, and Z3. Each of the upstream and downstream sections 7u and 7d, respectively, is assumed to have similar zones. With the motion of the pallet 28 in the direction of arrow 33, zone Z1 is the first or upstream zone of the section 7 and zone Z3 is the last or downstream zone. The zones Z1, Z2, and Z3 usually contain equal numbers of the roller-motor combinations. The upstream end of a particular zone is coincident with the downstream end of the adjacent upstream zone.

At the upstream end 35 of the first zone Z1, there is a pallet sensor 37. The sensor 37 may be of any suitable type, such as a limit switch or a proximity switch. Preferably, the sensor is attached to a frame support rail 23. Similar sensors 39, 41, and 43 are attached to the support rail at the downstream ends 45, 47, and 49 of the zones Z1, Z2, and Z3, respectively. A fifth sensor 51 on each section 7 is located at the upstream end 35 of the first zone Z1 in transverse alignment with the sensor 37. Sensors 37, 39, 41, and 43 are electrically wired to a conventional controller, such as a programmable logic controller, mounted in an enclosure 53. The enclosure 53 forms a part of the section 7. All the motors 29 of the section are also wired to and controlled by the programmable logic controller in the enclosure 53. If desired, the programmable logic controller may be designed to run the motors in both forward and reverse directions. The electrical connection of the sensor 51 is to the programmable logic controller of the adjacent upstream section 7u, as will be explained shortly.

The section 7 may include a work station 21 at any one or more of the zones Z1, Z2, and Z3. Depending upon the particular operation that is to be performed on the workpiece 3 at a particular work station, the work station may have a mechanical workpiece locating device typically represented at reference numeral 54. Such a locating device may include shot pin mechanisms 55. The workpiece locating device 54 and shot pin mechanisms 55 form no part of the present invention, and it will be appreciated that a wide variety of locating devices may be employed to suit the particular workpiece or pallet and the operation to be performed at the work station.

SHARP ANGLE CORNER

As mentioned, the workpiece path 1 may include one or more sharp angle corners 15 such as the right angle corners shown in FIGS. 1 and 5-7. At such a corner, the workpiece 3 may change orientation, or the workpiece may leave the corner with the same orientation as it entered the corner. To change orientation, the corner 15 includes a turntable mechanism 57. The turntable mechanism 57 is composed of a conventional rotary actuator 59 mounted to a corner frame 61. The rotary actuator 59 drives a base 65. The base 65 is supported on rollers 67 that in turn are mounted on the frame 61. Alternately, the base may be supported on a single large diameter bearing, now shown. To provide clearance for the corners 74 of the turntable base 65, a space 76 is necessary between the right angle corner 15 and the adjacent upstream section 7u'. A similar space 78 is provided between the right angle corner and the adjacent downstream section 7d'. Rollers 80 and 82 are mounted to the corner frame 61 to aid in supporting the pallets 28 as they enter and leave, respectively, the right angle corner and thus pass through the spaces 76 and 78.

Joined to the base 65 are upstanding side rails 70 that are generally similar to the side rails 23 of the straight sections 7 described previously. Rollers 72 substantially similar to the rollers 27 are rotatably mounted between the corner section side rails 70. A separate electric motor 69 and drive 71 are used to power each of the rollers 72 in a manner identical to the driving of the rollers 27 explained previously in connection with the straight sections 7. All the motors 69 and rollers 72 of the corner section 15 comprise a single zone Zt. The motors are wired to and controlled by a controller such as a programmable logic controller, not shown, mounted to the corner frame 61.

The upstream end 73 of the right angle corner zone Zt has a sensor 75, and the downstream end 77 has another sensor 79. In addition, a third sensor 81 is located at the upstream end 73 in transverse alignment with the first sensor 75. The sensors 75 and 79 are wired to and controlled by the right angle corner programmable logic controller to which the electric motors 69 are wired. The sensor 81 is wired to the adjacent upstream straight section 7u'. Sensor 51d' of the adjacent downstream section 7d' is wired to the programmable logic controller of the right angle corner.

ACCUMULATING CORNER

Figure 8:
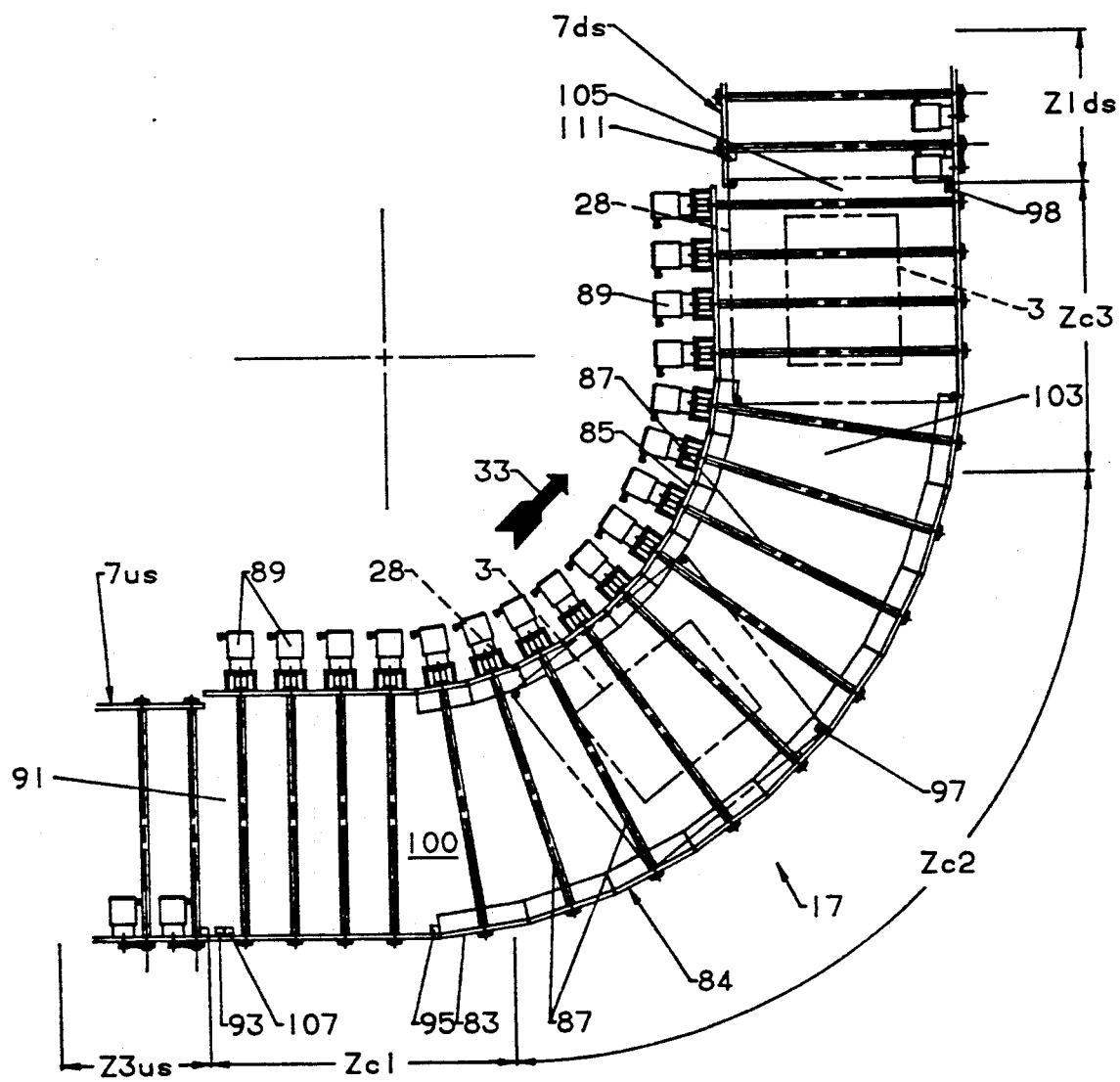
FIG. 8 is a top view of an accumulating corner according to the present invention.

It will be noticed from FIG. 1 that the path 1 of the zone controlled conveyance system 5 includes a radiussed or accumulating corner 17. Although accumulating corners require more space than right angle corners 15, the accumulating corners are more reliable in operation. Detailed construction of an accumulating corner is shown in FIG. 8. An accumulating corner frame 84 includes a pair of upstanding curved support plates 83 and 85 having rollers 87 rotatably mounted between them. The rollers 87 may be tapered, if desired, as is known in the art. Each roller 87 is driven by an individual electric motor 89. To conserve space, it is preferred that the motors 89 be directly connected to their associated rollers 87. The motors 89 are wired to and controlled by a controller such as a programmable logic controller associated with the corner frame 84.

Like the straight sections 7 of the zone controlled conveyance system 5, the accumulating corners 17 are divided into an integral number of zones. In FIG. 8, it will be assumed that three zones are present: an upstream zone Zc1, a downstream zone Zc3, and a zone Zc2 between the upstream and downstream zones. A sensor 93 is attached to the accumulating corner frame 84 at the upstream end 91 of the upstream zone Zc1. Other sensors 95, 97, and 98 are located at the downstream ends 100, 103, and 105 of the zones Zc1, Zc2, and Zc3, respectively. The sensors 93, 95, 97, 98, and 111 are wired to the accumulating corner programmable controller to which the electric motors 89 are wired. An auxiliary sensor 107 is wired to the programmable controller of the adjacent upstream straight section 7us.

CONTROL

Figure 9:
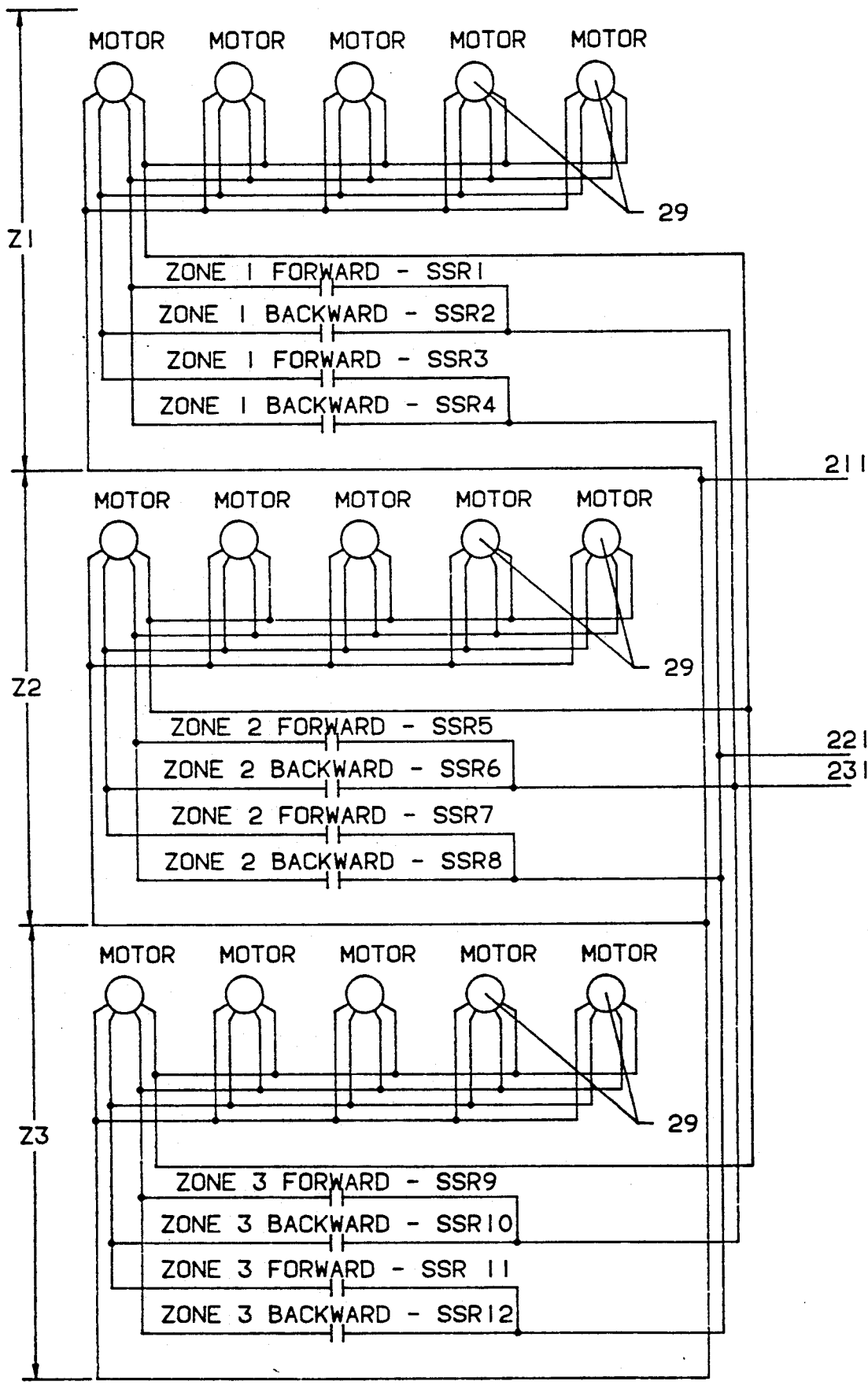
FIGS. 9 and 10 are schematic diagrams of an electric circuit for controlling movement of a workpiece through a section of the zone controlled conveyance system.
Figure 10:
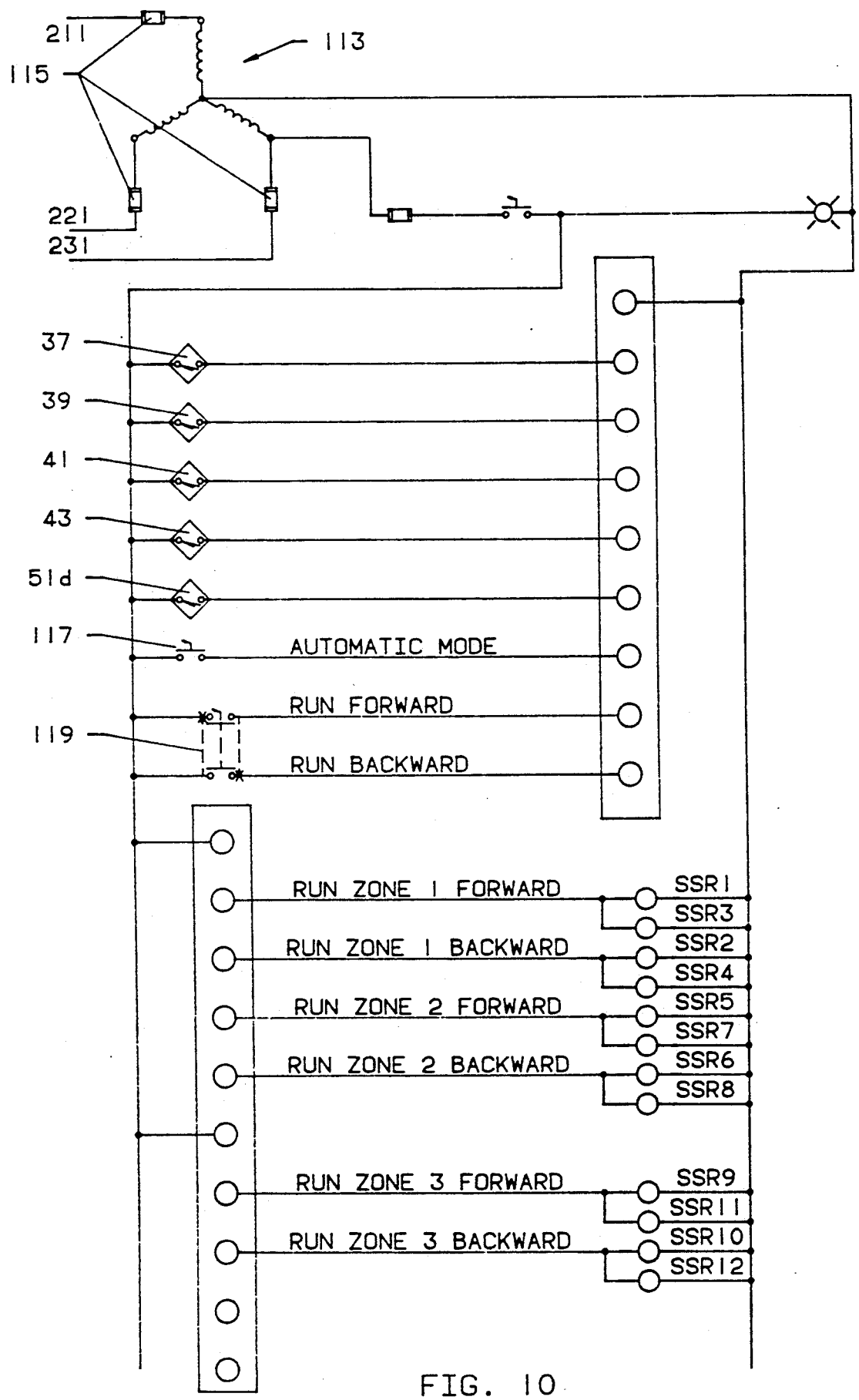

FIGS. 9 and 10 show an electrical circuit that may be employed to operate a section 7 of the non-mechanical drive conveyance system 5. The motors of each zone Z1, Z2, and Z3 are indicated at reference numerals 29. Each section obtains electric power from a common transformer 113 through appropriate fuses 115. The sensors 37, 39, 41, and 43 of the section are indicated in FIG. 10. Sensor 51d is mounted on the adjacent downstream section 7d, FIG. 2. Switch 117 is used to place the system in an automatic mode. Switch 119 is used to manually run the motors of a section in the forward or backward directions. In addition to controlling the flow of workpieces 3 along the path 1, the controllers may also be designed to control the assembly operation at a work station 21 located within the associated section 7. As an alternative to a programmable logic controller, the individual section controllers may be designed as dedicated single board computer input/output devices. These devices could communicate over a nework that eliminates the need for the auxiliary sensors 37 and 51.

OPERATION

The operation of the zone controlled conveyance system 5 will be explained initially in connection with FIGS. 1-3, 9, and 10. Initially, it will be assumed that a workpiece 3a mounted on a pallet 28a is being propelled in the downstream direction of arrow 33 to the section 7 from the adjacent upstream section 7u. As the leading edge 99 of the pallet 28a enters section 7, the leading edge is sensed by the sensor 37 of the first zone Z1 to actuate that sensor. The actuation of sensor 37 is processed by the controller or programmable logic controller in the enclosure 53 of section 7 to energize the electric motors 29 of the first zone Z1. Accordingly, the rollers 27 of the first zone rotate to receive the pallet from the adjacent upstream section and to propel the pallet completely into the first zone of section 7. The rollers of the first zone propel the pallet 28a and workpiece 3a downstream toward the second zone Z2. Accordingly, the pallet leading edge 99 is sensed by the sensor 39 at the downstream end of the first zone Z1. Subject to limitations to be described presently, sensing of the pallet leading edge by the sensor 39 causes the programmable logic controller to start the motors 29 of the second zone to receive the pallet and to propel it completely into the second zone Z2. When the pallet is completely within the second zone, the pallet trailing edge 109 is sensed by the sensor 39. The sensor 39 deactuates, and the programmable logic controller deenergizes the motors 29 of the first zone until another pallet and workpiece come along from the adjacent upstream section 7u. In that way, only the motors associated with the rollers 27 that are necessary to propel a pallet are energized, thereby conserving electricity and prolonging motor and roller service lives.

The leading edge 99 of the moving pallet 28a in the second zone Z2 eventually actuates sensor 41, thereby energizing the motors 29 of zone Z3. When the trailing edge 109 of the pallet is sensed by the sensor 41, the motors of the second zone are deenergized.

If a work station 21 is present at a particular zone of the section 7, a master controller, not shown in the drawings, operates in conjunction with the programmable logic controller of that section to perform the necessary operations. Upon the pallet completely entering the section zone associated with the work station, the programmable logic controller deenergizes the electric motors 29 of that zone. Consequently, the rollers 27 cease to rotate and the pallet stops. In many situations, the accuracy and repeatability of pallet location at the work station as controlled by the electric motors and the associated rollers are adequate for the particular operation to be performed at the work station. If accurate workpiece positioning is required, or if the particular operation performed at the work station has a tendency to move the pallet excessively, a positive locating device 54 can be installed at the work station. Operation of the locating device can be controlled by the master controller or by the programmable logic controller of the section. Upon completion of the operation at the work station, the locating mechanism, when used, is operated to release the pallet. The motors of the section zone are reenergized to rotate the corresponding rollers and propel the pallet and workpiece downstream from the work station.

It is a feature of the present invention that the sensing of a pallet leading edge 99 at the downstream end of a particular section zone does not necessarily result in the energization of the rollers of the adjacent downstream zone. Rather, after a sensor has been actuated by the leading edge 99 of a pallet 28a, the programmable logic controller checks the status of the sensor at the downstream end of the adjacent downstream zone. For example, the sensing of the leading edge of a pallet in zone 1 by the sensor 39 does not automatically cause motors 29 of zone Z2 to start and rotate the rollers 27 of that zone. Instead, the programmable logic controller checks the status of the sensor 41 after sensor 39 has sensed the presence of the pallet leading edge. If the status of the sensor 41 is that of being deactuated or open as produced by the passage of the trailing edge 101 of a pallet, the programmable logic controller starts the motors of zone Z2. However, if the status of the sensor 41 is that of being activated or closed as by sensing the leading edge 99 of a pallet, the programmable logic controller overrides the signal from the sensor 39 and does not energize the electric motors of the downstream zone Z2. That is because a pallet is present in the downstream zone, such as at a work station 21 at that zone. Further, if sensor 41 is activated to the status of indicating that a pallet is present in zone Z2, the programmable logic controller commands the motors in zone Z1 to stop as soon as sensor 39 senses the leading edge of a pallet in zone Z1. In that manner, pallets can accumulate in adjoining zones under complete control and without bumping each other. When the operation at the work station at zone Z2 is completed, the programmable logic controller reenergizes the motors of that zone to propel the pallets downstream. The programmable logic controller also commands the motors of upstream zone Z1 to reenergize and to propel the pallet at that zone into zone Z2.

Similarly, the pallets upstream from zone Z1 also are stopped in their respective zones if a pallet is present in zone Z1. For that purpose, the auxiliary sensor 51 is utilized. The sensor 51 is wired to the programmable logic controller of the adjacent upstream section, such as to section 7u relative to section 7. The sensor 51 performs the same function for the downstream zone of the adjacent upstream section 7u as the sensors 39, 41, and 43 perform for their respective zones Z1, Z2, and Z3, respectively. That is, the status of the sensor 51 is checked by the sensor at the downstream end of zone Z3u of the adjacent upstream section 7u before the motors of that zone will propel the pallet downstream to zone Z1 of section 7. Similarly, when sensor 43 senses the leading edge 99 of a pallet 28, the status of the sensor 51d of downstream zone Z1d is checked. If sensor 51d has the status of detecting a pallet, the motors of the zone Z3 of section 7 will stop. If sensor 51d has the status of not detecting a pallet, the motors of zone Z3 will remain energized to propel the pallet downstream from zone Z3 to zone Z1d. Because of the interplay between the auxiliary sensors 51, 51d, and the sensors of the corresponding adjacent upstream sections, the sensors 51, 51d are wired to their respective upstream sections.

Figure 5:
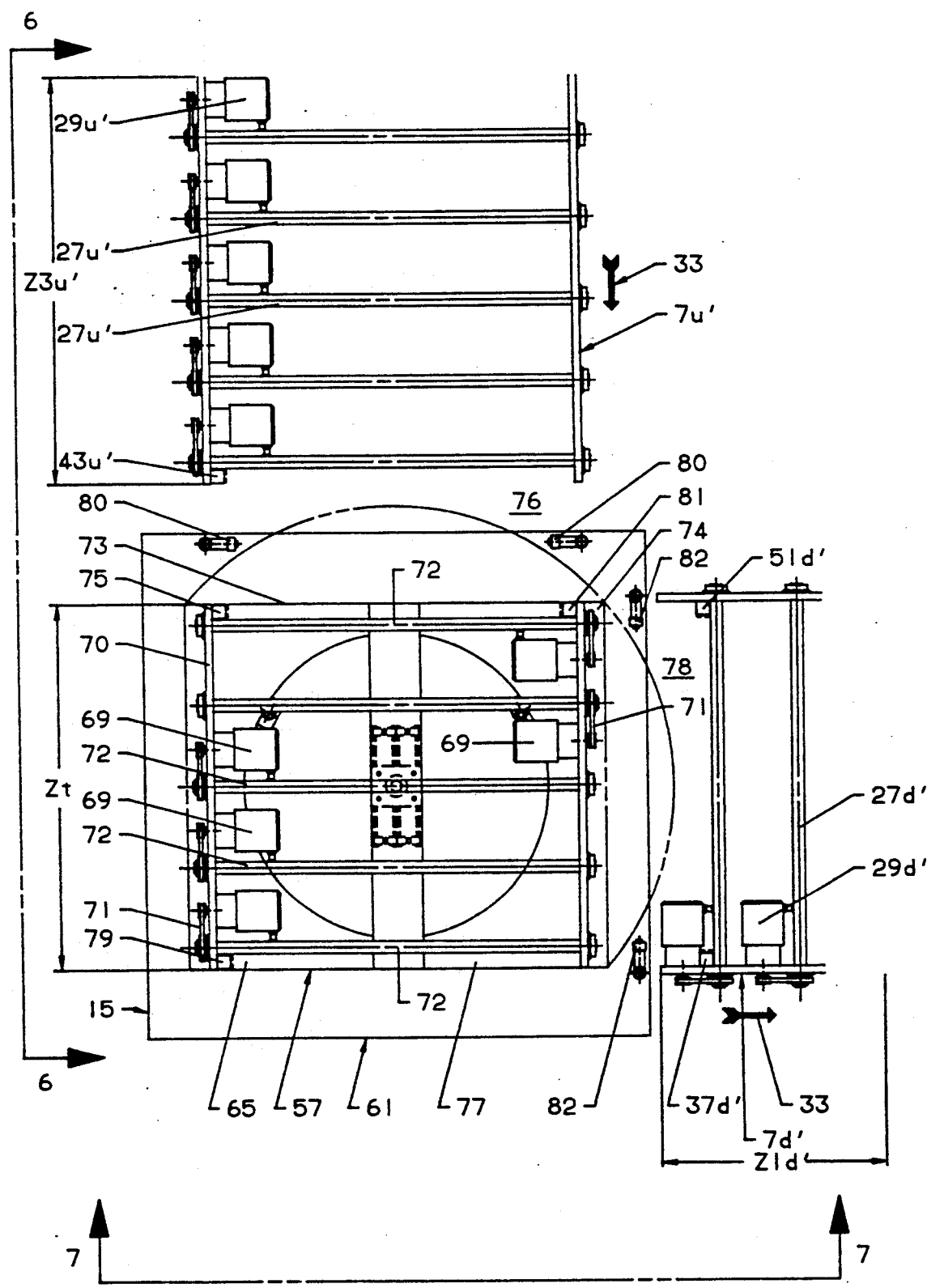
FIG. 5 is a top view of a right angle corner of the zone controlled conveyance system.
Figure 6:
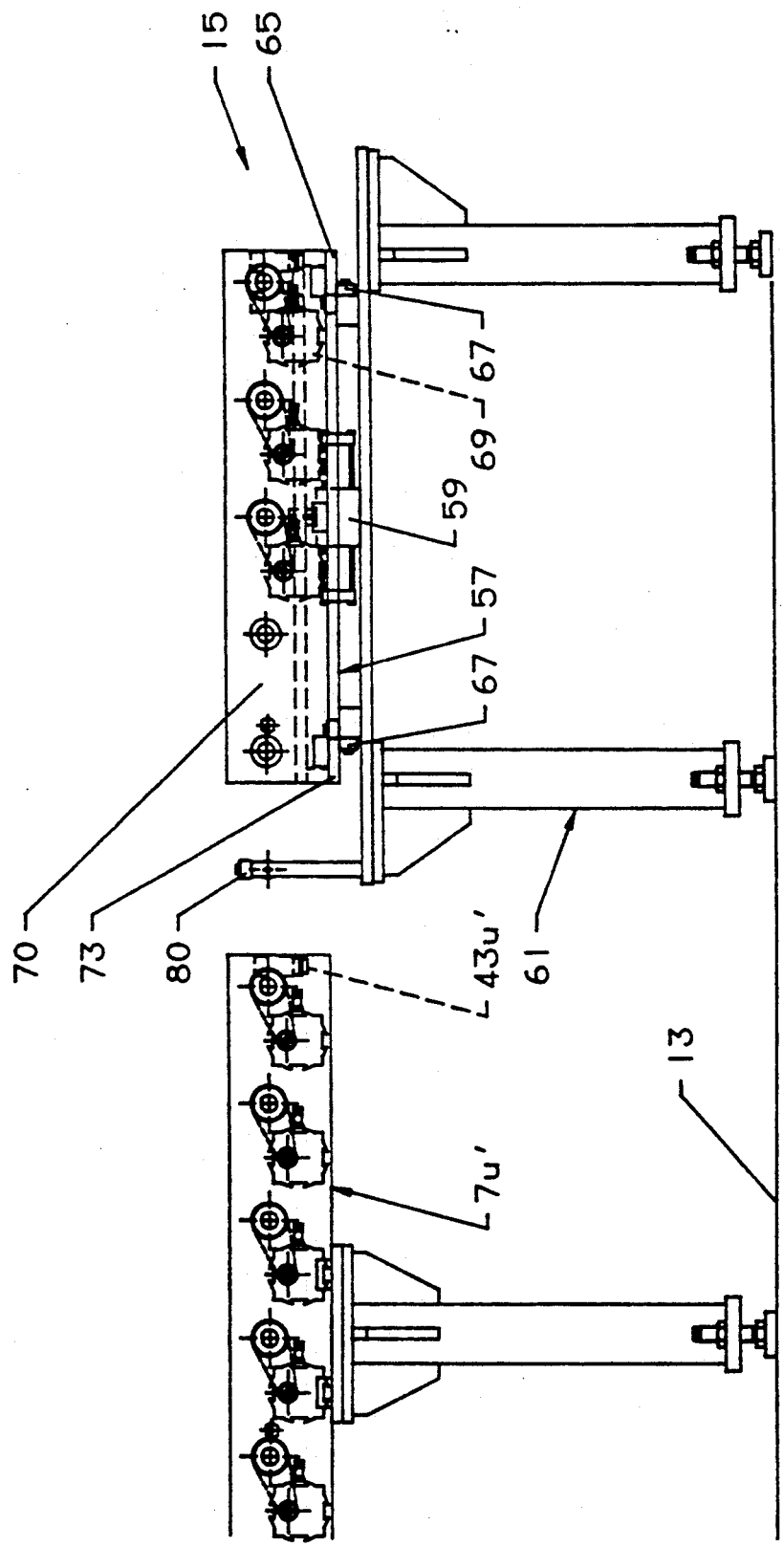
FIG. 6 is a view taken along lines 6—6 of FIG. 5 and rotated 90 degrees counterclockwise.
Figure 7:
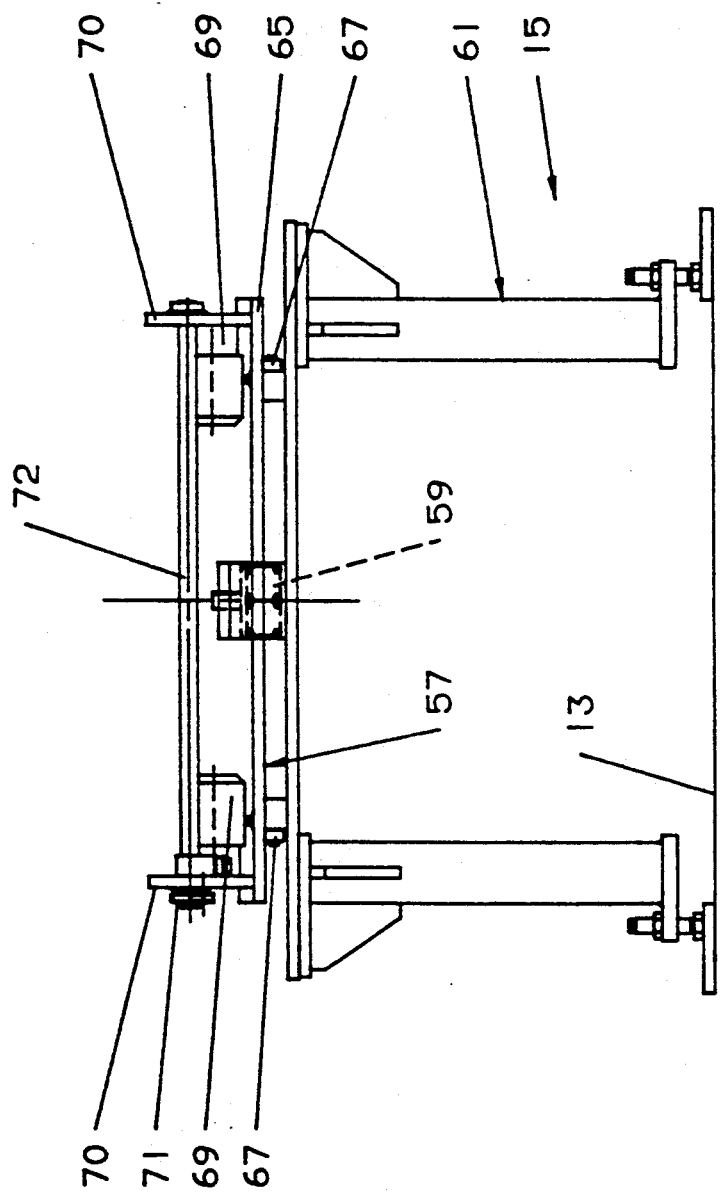
FIG. 7 is a view taken along lines 7—7 of FIG. 5.

The operation of the electric motors 69 and the rollers 72 of the sharp angle corners 15, FIGS. 5–7, is generally similar to the operation of the straight sections 7. The motors and rollers of a sharp angle corner comprise a single zone Zt. The motors are controlled by a programmable logic controller in conjunction with the sensors 75, 79, and 81 on the turntable base 65 and by the downstream auxiliary sensor 51d', which is wired to the programmable logic controller of the sharp angle corner but that is mounted to the adjacent downstream section 7d'.

Operation of the accumulating corner 17, FIG. 8, is substantially similar to the operation of a straight section 7. The various zones Zc1, Zc2, and Zc3 are controlled by a programmable logic controller in conjunction with sensors 93, 95, 97, and 98 mounted on the accumulating corner frame 84 and in conjunction with the auxiliary sensor 111 mounted on the adjacent downstream straight section 7ds.

Thus, it is apparent that there has been provided, in accordance with the invention, a zone controlled conveyance system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A zone controlled conveyance system for propelling a workpiece comprising a plurality of sections arranged end-to-end to define a path along which the workpiece is propelled in a downstream direction to a selected section from an adjacent upstream section and from the selected section to an adjacent downstream section, each section comprising a frame, a plurality of rollers rotatably mounted in the frame for supporting the workpiece thereon, and a plurality of motors fastened to the frame, each motor individually driving a separate roller, wherein:
   a. the motors and associated rollers of each section are grouped into a predetermined number of zones, there being a sufficient number of rollers in each zone to completely support a selected workpiece thereon, each section having an upstream zone and a downstream zone and each zone having an upstream end and a downstream end; and
   b. each section further comprises controller means for controlling the energization of the motors of each zone independently of the energization of the motors of the other zones,
   so that energization of selected motors causes the associated rollers to rotate and propel a workpiece supported on the rotating rollers in the downstream direction and a different workpiece can be supported by the rollers of the respective zones and the propulsion of a selected workpiece can be independent of the propulsion of all other workpieces.

2. The zone controlled conveyance system of claim 1 further comprising sensor means mounted to the section in association with each zone therein for sensing the presence or absence of a workpiece in the respective zones.

3. The zone controlled conveyance system of claim 1 further comprising a downstream sensor attached to the frame at the downstream end of each zone for sensing the presence or absence of a workpiece within the respective zones, each downstream sensor being electrically connected to the controller means for cooperating therewith to selectively energize the motors of the adjacent downstream zone in response to sensing the presence or absence of a workpiece.

4. The zone controlled conveyance system of claim 1 further comprising an upstream sensor attached to the frame of each section at the upstream end of the upstream zone thereof, the upstream sensor being electrically connected to the controller means for cooperating therewith to selectively energize the motors of the upstream zone of the section in response to a workpiece approaching the upstream zone of the section from the adjacent upstream section.

5. The zone controlled conveyance system of claim further comprising an auxiliary sensor attached to the frame of each section at the upstream end of the upstream zone thereof, the auxiliary sensor being electrically connected to the controller means of the adjacent upstream section for cooperating therewith to selectively energize the motors of downstream zone of the adjacent upstream section in response to sensing the presence or absence of a workpiece.

6. The zone controller conveyance system of claim 1 wherein at least one of the sections is a sharp corner section, and wherein the motors and rollers of the sharp corner section comprise a single zone.

7. An elongated modular section for propelling a workpiece having a predetermined length therealong from an upstream end to a downstream end comprising:
   a. a frame;
   b. a plurality of rollers rotatably mounted to the frame for supporting the workpiece and for defining a generally horizontal path;
   c. a plurality of motors fastened to the frame proximate respective rollers; and
   d. a plurality of drive means for rotating the rollers in response to energization of the respective motors, wherein:
      i. the rollers and their respective motors and drive means are grouped into a predetermined number of zones, the section having an upstream zone and a downstream zone, each zone having an upstream end and a downstream end; and
      ii. the section further comprises controller means for selectively energizing the motors of each zone independently of the motors of the other zones,
      so that energization of the motors causes the workpiece to be propelled by the rollers in a downstream direction along the path from the section upstream end toward the section downstream end and the rollers of a selected zone can be selectively rotated to propel or stop a workpiece independently of the rotation of the rollers of the other section zones.

8. The section of claim 7 further comprising upstream sensor means attached to the frame at the upstream end of the upstream zone for cooperating with the controller means to sense the approach of a workpiece to the upstream end of the section and for energizing the motors of the upstream zone in response to sensing the approach of a workpiece.
   so that the rollers of the upstream zone can rotate to receive the workpiece and propel it completely into the upstream zone.

9. The section of claim 7 further comprising a downstream sensor attached to the frame at the downstream end of each zone for sensing the presence or absence of a workpiece within the respective zones, the downstream sensor of a selected zone cooperating with the controller means to selectively energize or deenergize the motors of the adjacent upstream zone and of the adjacent downstream zone in response to sensing the presence or absence of a workpiece within the selected zone.

10. The section of claim 7 further comprising an auxiliary sensor attached to the frame at the upstream end thereof for sensing the presence or absence of a workpiece within the upstream zone.

11. The section of claim 7 wherein at least one zone contains a sufficient number of rollers to support the workpiece along the entire length thereof.

12. An elongated nodular section for propelling a workpiece therealong from an upstream end to a downstream end comprising:
   a. frame;
   b. a plurality of rollers rotatably mounted to the frame for supporting the workpiece and for defining a generally horizontal path;
   c. a plurality of motors fastened to the frame proximate respective rollers;
   d. a plurality of drive means for rotating the rollers in response to energization of the respective motors, wherein
      the rollers, motors, and drive means of the section comprise a zone having an upstream end and a downstream end;
   e. turntable means for selectively rotating the frame about a vertical axis; and
   f. controller means for selectively energizing the motors to propel the workpiece on the rollers in a downstream direction along the horizontal path from the zone upstream end to the zone downstream end.

13. The section of claim 12 further comprising upstream sensor means attached to the frame at the zone upstream end for sensing the approach of a workpiece at the zone upstream end and for cooperating with the controller means to selectively energize the section motors to receive the workpiece and propel it in the downstream direction.

14. The section of claim 12 further comprising downstream sensor means attached to the frame at the zone downstream end for sensing the presence or absence of a workpiece within the zone and for cooperating with the controller means to selectively energize the motors and thereby propel the workpiece downstream through the section.

15. The section of claim 12 further comprising auxiliary sensor means attached to the frame at the zone upstream end for sensing the presence or absence of a workpiece within the zone and for cooperating with a controller of an adjacent upstream section to selectively energize the motors in the adjacent upstream zone.

16. A method of propelling a workpiece in a downstream direction comprising the steps of:
 a. providing a plurality of rollers that define a generally horizontal path;
 b. connecting each roller to a separate motor;
 c. grouping the rollers and their associated motors into a predetermined number of zones having respective upstream and downstream ends, each zone being between an adjacent upstream zone and an adjacent downstream zone;
 d. placing the workpiece on the rollers; and
 e. energizing the motors of selected zones to thereby rotate the respective associated rollers and propel a workpiece supported thereon independently of the energization of the motors and the propulsion of workpieces of the other zones.

17. The method of claim 16 further comprising the steps of:
 a. sensing the approach of a workpiece at the upstream end of a selected zone; and
 b. energizing the motors associated with the selected zone,
  so that the rollers of the selected zone rotate to receive the workpiece and to propel it into the selected zone.

18. The method of claim 16 further comprising the steps of:
 a. sensing the presence of a workpiece within a selected zone; and
 b. energizing the motors of the adjacent downstream zone of the selected zone to thereby enable the adjacent downstream zone to receive the workpiece from the selected zone and to propel the workpiece into the adjacent downstream zone.

19. The method of claim 16 further comprising the steps of:
 a. sensing the presence of a workpiece within a selected zone; and
 b. deenergizing the motors of the adjacent upstream zone of the selected zone,
  so that the rollers of the adjacent upstream zone of the selected zone do not propel a workpiece into the selected zone when a workpiece is present in the selected zone.

* * * * *